United States Patent
McGee et al.

(10) Patent No.: US 6,943,671 B2
(45) Date of Patent: Sep. 13, 2005

(54) GENERATING AN ALARM BASED ON LOCATION AND TIME

(75) Inventors: Michael Sean McGee, Round Rock, TX (US); James Randall Walker, Austin, TX (US); Michael S. McIntyre, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 10/417,984

(22) Filed: Apr. 17, 2003

(65) Prior Publication Data

US 2004/0207522 A1 Oct. 21, 2004

(51) Int. Cl.[7] ................................................. G08B 3/10
(52) U.S. Cl. ........................... 340/384.71; 340/309.16; 340/309.7; 340/539.11; 340/539.13; 342/357.1; 342/357.06

(58) Field of Search ....................... 340/384.71, 309.16, 340/309.3, 309.7, 539.1, 539.11, 539.13; 342/357.1, 357.06, 342.13

(56) References Cited

U.S. PATENT DOCUMENTS

| 6,317,797 B2 | 11/2001 | Clark et al. |
| 6,392,548 B2 | 5/2002 | Farringdon et al. |
| 6,429,812 B1 * | 8/2002 | Hoffberg ................. 342/357.1 |
| 6,496,116 B2 | 12/2002 | Farringdon et al. |

* cited by examiner

Primary Examiner—Daryl C Pope

(57) ABSTRACT

A portable device includes a location detector, a time detector, and an alarm module to generate alarms based on both time-based and location-based criteria. A current time provided by the time detector is compared to a time-based criterion, and a current geographical location provided by the location detector (e.g., global positioning system or GPS receiver) is compared to a location-based criterion to determine whether or not to generate an alarm.

16 Claims, 2 Drawing Sheets

GENERATING AN ALARM BASED ON LOCATION AND TIME

BACKGROUND

Alarms are often used as reminders of tasks that need to be performed. For example, the most basic of alarms are those provided by alarm clocks that sound at preset times. Handheld devices, such as personal digital assistants (PDAs), mobile telephones, and other devices, also provide alarm features that enable users to set alarms at preset times. Handheld devices have the advantage that the users can carry such devices with them wherever they travel, so that the users are able to hear or see the alarm when the alarm is activated.

However, basing an alarm only on time reduces flexibility to a user. An alarm may pertain to a task to be performed by a user at a given location. However, when the alarm is activated at the preset time, the user may be far away from that location. If a user is unable to perform the task close to a time at which the alarm is activated, the user may forget to return to the task at a later point in time, which defeats the purpose of such an alarm.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
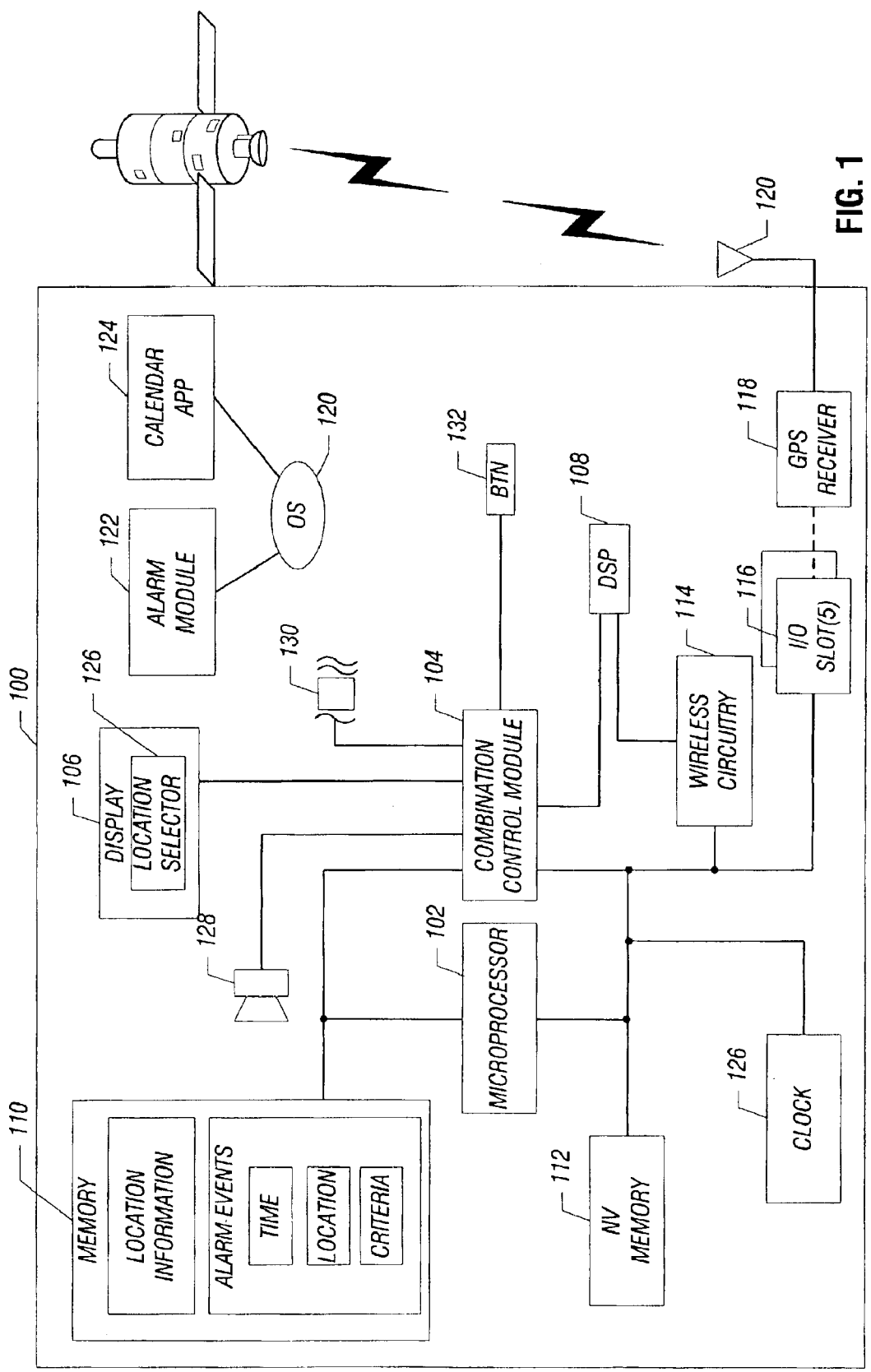
FIG. 1 is a block diagram of an example arrangement of a handheld device.

FIG. 1 shows an example handheld device 100 for setting alarms or user notifications according to some embodiments. The arrangement shown in FIG. 1 is provided as an example only, and is not intended to limit the scope of the invention. The alarm or user notification setting mechanism according to some embodiments can be implemented in other types of platforms, such as mobile telephones or other types of handheld or portable devices.

As used here, a "user notification" or "alarm" refers to any indication (visual, audio, vibration-based, or otherwise) provided to a user if certain criteria are met. Such criteria include location-based criteria and time-based criteria. The portable or handheld device includes a location detector to enable the detection of a geographic location of the portable or handheld device. Additionally, the portable or handheld device also includes a time detector to determine a current time. The current location and time are compared to preset location-based and time-based criteria to determine whether an alarm is to be generated.

According to one implementation, a user may set alarms for multiple tasks to be performed at corresponding different locations. For example, a first task may be performed at a first location, a second task may be performed at a second location, and so forth. Also, these tasks are to be performed within some predefined time period (e.g., weekly, monthly, etc.). When a user is in proximity of a location corresponding to one of the tasks, as determined by the location detector in the handheld device, the handheld device generates an alarm for the task. Upon performing the task, the user sets some type of an indication that the task has been performed. At or close to the end of the predefined time period, the handheld device may determine whether each of the tasks have been performed. If one or more of the tasks have not been performed within the predefined time period, the handheld device provides a notification to the user of such un-performed tasks.

In another implementation, the criteria for generating an alarm is according to the following. The handheld device determines a current location and determines whether a preset time event has occurred. In response to determining that the preset time event has occurred, the handheld device generates an alarm unless the current location does not satisfy a location criterion.

Other criteria can be employed in other implementations for generating alarms by the handheld device.

As shown in FIG. 1, the handheld device 100 includes a microprocessor 102 (or alternatively, a microcontroller or other control device) that is the processing core of the handheld device 100. The microprocessor 102 is coupled to a combination control module 104, which has various portions for controlling various peripheral elements of the handheld device 100. For example, the combination control module 104 includes a video controller to control the display of images in a display 106 of the handheld device 100. Also, the combination control module also includes a memory controller that controls access of a memory 110 and a non-volatile memory 112. The combination control module 104 is also connected by one or more buses to a digital signal processor (DSP) 108, wireless circuitry 114, and input/output (I/O) slots 116 (such as PCMCIA slots).

Although the combination control module 104 shown in FIG. 1 is an integrated unit having multiple functional portions, other embodiments may employ multiple discrete units to perform the tasks of the combination control module 104.

The wireless circuitry 114 enables wireless communications between the handheld device 100 and other devices over a wireless network. In addition, according to one embodiment, a GPS (global positioning system) receiver 118 is coupled to one of the I/O slots 116. The GPS receiver 118 has an antenna 120 to receive GPS information, including location information to indicate to the handheld device 100 where geographically the handheld device is located. Alternatively, instead of a GPS receiver, another type of location detector can be employed, such as one that uses signals provided by a cellular communications network to determine a location of the handheld device 100.

The handheld device 100 also includes an operating system 120, as well as application-level software modules for performing various tasks in the handheld device 100. FIG. 1 shows an alarm module 122 and a calendar application 124. The alarm module 122, in accordance with some embodiments of the invention, generates an alarm or user notification based on preset time and location criteria. The current time is provided by an internal time detector (e.g., a clock) 126 to the alarm module 122. Instead of using time information from the internal clock 126, the handheld device may alternatively receive time information from an external source, such as from time data received by the GPS 118 receiver.

The alarm generated by the handheld device 100 can be a visual alarm for display in the display 106. Alternatively, the alarm can be an audio alarm, which can be provided through a speaker 128. As yet another alternative, the alarm can be a vibration-based alarm provided by a vibration device 130. Also, the alarm can be a combination of visual, audio, and/or vibration alarms.

According to one embodiment, the alarm module 122 works in conjunction with the calendar application 124. A user sets alarm criteria through the calendar application 124, such as through a graphical user interface (GUI) provided by the calendar application. The alarm criteria is communicated to the alarm module 122, which generates an alarm in response to the criteria being satisfied. In an alternative embodiment, the alarm module 122 can be part of the calendar application 124.

The calendar application 124 presents its graphical user interface in the display 106. One of the elements of the graphical user interface is a location selector 126 that enables a user to select locations for tasks to be performed. As an example, the location selector 126 can be a map that allows a user to select a location on the map. Alternatively, the user can input an address or other location indicator into the graphical user interface. In yet another embodiment, a user can travel to a particular location and press a button 132 to indicate the location for which the user wishes to set an alarm. Activation of the button 132 causes the current location of the handheld device 100, indicated by the GPS receiver 118, to be recorded as a location criterion.

The time-based criteria, location-based criteria, and other criteria are alarm events that the alarm module 122 uses to determine whether to generate an alarm. Information relating to such alarm events are stored in the memory 110, as shown in FIG. 1. Also stored in the memory 110 is location information, such as map information, an address directory, and so forth, to enable a user to select a location to be used as a location-based criterion for generating an alarm.

Figure 2:
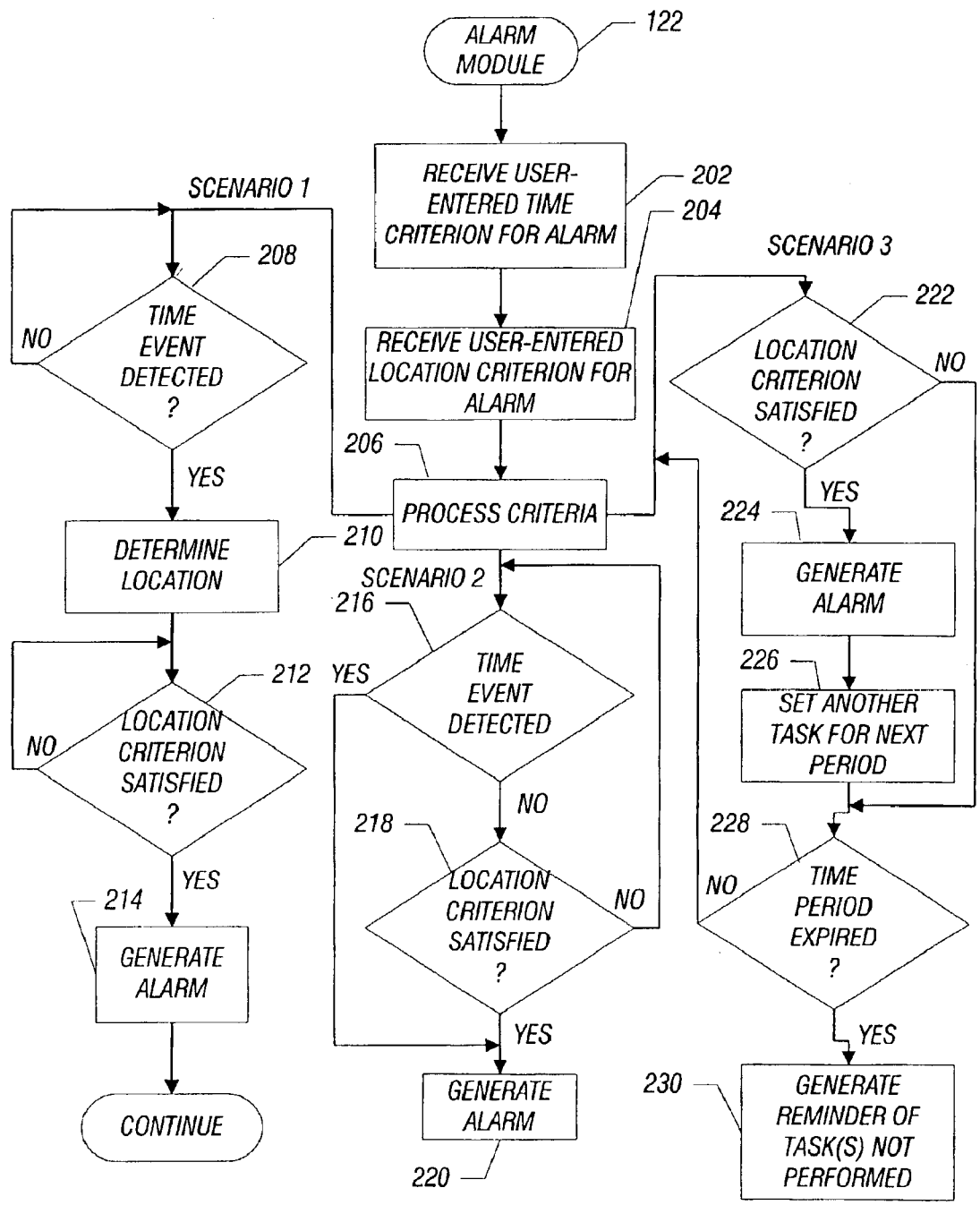
FIG. 2 is a flow diagram of a process performed in the handheld device in accordance with one embodiment.

FIG. 2 shows a process performed by the alarm module 22 according to one embodiment. The alarm module 122 receives (at 202) a user-entered time criterion for an alarm. Note that if multiple alarms are set, multiple time criteria for the alarms can be set. Additionally, instead of an individual preset time for each task, a predefined time period can be set in which one or multiple tasks are to be performed.

Next, the alarm module 122 receives (at 204) a user-entered location criterion for the alarm. If multiple tasks are involved, then multiple locations can be set for corresponding alarms. Note that a given alarm may be associated with both time and location criteria. Also, a group of tasks may be associated with one time criterion but multiple location criteria.

The alarm module 122 then processes (at 206) the user-entered time and location criteria. In the embodiment shown in FIG. 2, three scenarios are possible based on the criteria entered by the user. In a first scenario, the alarm module detects (at 208) if a time event has occurred. Occurrence of a time event refers to a current time satisfying a time criterion (e.g., current time is equal to preset alarm time of 3:00 p.m.) or current time is within a predefined time period (e.g., between 3:00 and 5:00 p.m.). If the time event has occurred, the alarm module 122 determines (at 210) the location of the handheld device 100 based on location data received from the GPS receiver 118. This current location information is compared to the location criterion entered by the user. If the location criterion is satisfied (e.g., handheld device is in predefined proximity to location X), as determined at 212, an alarm is generated (at 214). Thus, in this first scenario, once a time event occurs, an alarm is generated unless a location criterion is not satisfied. In other words, the alarm module 122 generates an alarm at the preset time unless the handheld device 100 is not at or in the proximity of a preset location.

An example of this first scenario involves a user who sets a reminder to take out the trash every Monday morning in the period between 8:00 a.m. to 10:00 a.m. (the preset time event). The alarm is generated during the period unless the location criterion is not satisfied, that is, the user is not in the proximity of a predefined location, such as the garage.

In a second scenario, the alarm module 122 determines (at 216) if a time event has occurred. If so, then an alarm is generated. However, if the time event has not occurred, then the alarm module 122 determines if the location criterion is satisfied (at 218). If so, then the alarm is generated (at 220). In this case, the alarm module 122 generates the alarm based upon the first occurrence of either the time event or the location event.

As an example of the second scenario, a handheld user sets a reminder to stop and see the user's mother in a nursing home at 6:00 p.m. that day or whenever the user passes within one mile of the nursing home, whichever occurs first.

In a third scenario, multiple tasks are associated with respective location criteria and one time criterion. For example, a user may wish to visit several clients each month. In this case, alarms to remind of such visits are associated with multiple locations (of the clients) and a preset time period (e.g., a defined monthly period). The alarm module 122 determines (at 222) if a location criterion (e.g., the user is in close proximity to a given client) has been satisfied. If so, an alarm is generated (at 224) indicating the task to be performed. Once the user performs a task, the user can mark the task as being performed. In this case, the alarm module 122 sets (at 226) another alarm for this task in the next period (e.g., next month). Thus, in the next time period (e.g., next month) the same set of alarms are automatically set so that reminders of the tasks are repeated.

The alarm module 122 then determines (at 228) if the predefined time period has expired or is close to expiring. If so, the alarm module 122 generates (at 230) a reminder of tasks that have not been performed in the current period so that the user is reminded to perform such tasks. However, if the predefined time period has not expired or is not close to expiring, then the acts 222–228 are repeated.

Instructions of the various software routines or modules (e.g., alarm module or calendar application) discussed herein are loaded for execution on a corresponding control unit or processor. The control unit or processor includes a microprocessor, a microcontroller, a processor module or subsystem (including one or more microprocessors or microcontrollers), or other control or computing devices. As used here, a "controller" refers to either software or hardware, or a combination of both. Also, a "controller" can refer to multiple software and/or hardware modules.

Data and instructions (of the various software routines or modules) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of generating an alarm using a portable device, comprising:

receiving indication of a location of the portable device;

storing information relating to tasks to be performed;

generating an alarm by the portable device in response to the received location indication, the alarm providing a reminder of at least one of the tasks;

checking if each of the tasks has been performed within a current predefined time period; and generating a reminder for each task not performed within the current predefined time period in response to the checking.

2. The method of claim 1, further comprising, for each task performed, generating and storing further information relating to the performed task to enable another alarm in a predefined time period subsequent to the current predefined time period.

3. The method of claim 1, wherein determining the location of the portable device comprises determining the location using global positioning system (GPS) data.

4. The method of claim 1, further comprising:

receiving further indication of another location of the portable device in response to movement of the portable device to the another location; and generating another alarm by the portable device in response to the received further location indication.

5. The method of claim 1, wherein storing the information relating to the tasks comprises storing:

information relating to a location at which each task is to be performed, and information indicating the current predefined time period in which the tasks are to be performed.

6. The method of claim 1, wherein generating the alarm comprises generating at least one of the following alarms: audio alarm, visual alarm, and vibration-based alarm.

7. A notification method, comprising:

determining a current location;

determining whether a preset time event has occurred; and in response to determining that the preset time event has occurred, generating an alarm unless the current location does not satisfy a location criterion.

8. The method of claim 7, wherein determining the current location comprises receiving an indication of the current location.

9. The method of claim 8, wherein receiving the indication of the current location comprises receiving global positioning system (GPS) data.

10. An apparatus comprising:

a storage to store information relating to a time event and a location event;

a location detector to determine a current location of the apparatus;

a time detector to provide a current time;

a controller to compare the current location to the information relating to the location event and to compare the current time to the information relating to the time event, the controller to generate an alarm in response to occurrence of the time event and location event, whichever occurs first, wherein the controller is adapted to detect for first occurrence of the time event and the location event.

11. The apparatus of claim 10, wherein the location detector comprises a global positioning data receiver.

12. An article comprising at least one storage medium containing instructions that when executed cause a portable device to:

receive indication of a location of the portable device;

store information relating to tasks to be performed;

generate an alarm by the portable device in response to the received location indication, the alarm providing a reminder of at least one of the tasks;

check if each of the tasks has been performed within a current predefined time period; and generate a reminder for each task not performed within the current predefined time period in response to the checking.

13. The article of claim 12, wherein the instructions when executed cause the portable device to store the information relating to the tasks by storing:

information relating to a location at which each task is to be performed, and information indicating the current predefined time period in which tasks are to be performed.

14. The article of claim 12, wherein the instructions when executed cause the portable device to generate the alarm by generating at least one of the following alarms: audio alarm, visual alarm, and vibration-based alarm.

15. The article of claim 12, wherein the instructions when executed cause the portable device to, for each task performed, generate and store further information relating to the performed task to enable another alarm in a predefined time period subsequent to the current predefined time period.

16. The article of claim 12, wherein the instructions when executed cause the portable device to:

receive further indication of another location of the portable device in response to movement of the portable device to the another location; and generate another alarm by the portable device in response to the received further location indication.

* * * * *